(12) United States Patent
Adriaansen et al.

(10) Patent No.: US 7,637,074 B2
(45) Date of Patent: Dec. 29, 2009

(54) STORM PANELS AND METHODS FOR MANUFACTURING THE SAME

(75) Inventors: Frans Adriaansen, JA Bergen op Zoom (NL); Constantin Donea, Evansville, IN (US); Herb Hummel, Long Sault (CA); Tammy Leigh Rucker, Chicago, IL (US); Abdul Qayyum Syed, Cornwall (CA)

(73) Assignee: Sabic Innovative Plastics IP B.V. (NL)

( * ) Notice: Subject to any disclaimer, the term of this patent is extended or adjusted under 35 U.S.C. 154(b) by 325 days.

(21) Appl. No.: 11/387,345

(22) Filed: Mar. 23, 2006

(65) Prior Publication Data

US 2007/0234681 A1    Oct. 11, 2007

(51) Int. Cl.
*E06B 3/30* (2006.01)
*E04C 2/32* (2006.01)

(52) U.S. Cl. .................................. 52/783.11; 52/202

(58) Field of Classification Search .................. 52/202, 52/203, 782.1, 783.11; 428/174, 182, 913.3
See application file for complete search history.

(56) References Cited

U.S. PATENT DOCUMENTS

| | | | | |
|---|---|---|---|---|
| 4,333,271 A | * | 6/1982 | DePaolo et al. | 49/464 |
| 4,567,084 A | * | 1/1986 | Juei Jse | 428/150 |
| 5,030,676 A | * | 7/1991 | Wallen | 524/182 |
| 5,306,548 A | * | 4/1994 | Zabrocki et al. | 428/215 |
| 5,334,450 A | * | 8/1994 | Zabrocki et al. | 428/332 |
| 5,426,893 A | * | 6/1995 | Hoffman | 49/464 |
| 5,457,921 A | * | 10/1995 | Kostrzecha | 52/202 |
| 5,579,615 A | * | 12/1996 | Hoffman | 52/202 |
| 5,651,221 A | * | 7/1997 | Golen | 52/202 |
| 5,855,099 A | * | 1/1999 | Hoffman | 52/202 |
| 5,927,028 A | * | 7/1999 | Rossi | 52/202 |
| 6,079,168 A | * | 6/2000 | Shaver | 52/202 |
| 6,189,264 B1 | * | 2/2001 | DiVeroli | 49/57 |
| 6,546,681 B1 | | 4/2003 | Trundle | |
| 6,615,555 B2 | | 9/2003 | Madden | |
| 6,811,841 B1 | * | 11/2004 | Castiglione et al. | 428/34 |
| 6,931,796 B2 | * | 8/2005 | Adriaansen et al. | 52/81.1 |
| 6,959,519 B2 | * | 11/2005 | Adriaansen | 52/537 |
| 6,974,622 B2 | * | 12/2005 | Wade | 428/182 |
| 7,169,859 B2 | * | 1/2007 | Davis et al. | 525/437 |
| 7,234,303 B2 | * | 6/2007 | Thiagarajan et al. | 60/641.8 |
| 7,238,419 B2 | * | 7/2007 | Kern et al. | 428/328 |
| 7,273,917 B2 | * | 9/2007 | Mullen | 528/196 |
| 7,279,594 B2 | * | 10/2007 | Donea et al. | 562/400 |

(Continued)

OTHER PUBLICATIONS

ASTM Int'l D 1003-00; Standard Test Method for Haze and Luminous Transmittance of Transparent Plastics; 6 pages.

(Continued)

*Primary Examiner*—Brian E Glessner
(74) *Attorney, Agent, or Firm*—Cantor Colburn LLP

(57) ABSTRACT

Disclosed herein are storm panels and methods for manufacturing the same. In one embodiment, the storm panel comprises a polymeric sheet having an arced geometry. The polymeric sheet comprises, a polymeric substrate layer, a polymeric top layer comprising an ultraviolet light stabilizer, a polymeric bottom layer comprising an ultraviolet light stabilizer. The storm panel has a uniform thickness, exhibits less than or equal to about 4.0% haze, and exhibits a yellowness index shift that is less than or equal to about 9.0 after 1,500 simulated hours of aging.

9 Claims, 3 Drawing Sheets

U.S. PATENT DOCUMENTS

| | | | |
|---|---|---|---|
| 7,321,014 B2 * | 1/2008 | Glasgow et al. | 525/464 |
| 7,323,535 B2 * | 1/2008 | Berkstresser et al. | 528/196 |
| 7,326,764 B2 * | 2/2008 | Di et al. | 528/196 |
| 2005/0136263 A1 * | 6/2005 | Roberts et al. | 428/423.1 |
| 2005/0159577 A1 * | 7/2005 | Davis et al. | 528/198 |
| 2006/0084763 A1 * | 4/2006 | Arhart et al. | 525/195 |
| 2006/0142527 A1 * | 6/2006 | Glasgow et al. | 528/26 |
| 2006/0179737 A1 * | 8/2006 | Trundle | 52/202 |
| 2006/0230695 A1 * | 10/2006 | Swergold | 52/202 |
| 2006/0264580 A1 * | 11/2006 | Mullen | 525/439 |
| 2007/0027268 A1 * | 2/2007 | Di et al. | 525/439 |
| 2007/0082989 A1 * | 4/2007 | Glasgow et al. | 524/284 |
| 2007/0100021 A1 * | 5/2007 | Glasgow et al. | 523/136 |
| 2007/0100038 A1 * | 5/2007 | Glasgow et al. | 524/167 |
| 2007/0117957 A1 * | 5/2007 | Mullen | 528/196 |
| 2007/0251166 A1 * | 11/2007 | Thiagarajan et al. | 52/177 |
| 2008/0014446 A1 * | 1/2008 | Donea et al. | 428/412 |

OTHER PUBLICATIONS

ASTM Int'l D 1925-70 (Reapproved 1988); Standard Test Method for Yellowness Index of Plastics; 3 pages.

Hurricane Shutter Comparison Chart; www.stormshutters.com/shutters/comparison.html; 6 pages.

"The Difference is Clear"; Transparent Protection Systems, Inc.; http://www.clearshutter.com/why.htm; 2 pages.

* cited by examiner

STORM PANELS AND METHODS FOR MANUFACTURING THE SAME

TECHNICAL FIELD

This disclosure generally relates to storm panels and methods for manufacturing the same.

BACKGROUND

Storm panels are widely used to protect glass windows, storefronts, doors, and other structural features from environmental hazards such as hurricanes and tornadoes. In order to meet the varying demands and financial resources of consumers, storm panels can be manufactured in many different configurations. For example, panels can be manufactured to comprise automatically operating designs or manually operated designs.

Automatically operated storm panels are generally integrated within the structure on which they are employed. These designs offer the benefits of being aesthetically discrete and ease of operation, wherein the panels can be selectively deployed or retracted within a relatively fast amount of time with little effort. Manually operated storm panels can comprise configurations that are either permanently attached to a structure or temporarily attached. Permanently attached designs comprise colonial shutters, bahama awnings, and the like. These designs can be secured to the exterior of a structure and manually operated at one's discretion. Although these designs are manually operated, they are generally considered to be of desirable aesthetic appearance. Temporarily attached storm panels are commonly employed as they can be temporarily secured to the exterior of a structure and removed therefrom at the owner/operators discretion, and can be the least expensive option for transparent storm protection.

Temporary storm panels can be fabricated from transparent and non-transparent materials. Non-transparent materials comprise metals (e.g., aluminum or galvanized steel), wood, and so forth, which can be easily obtained, however, they can be considered aesthetically unpleasing. Transparent panels can be fabricated from polymers, such as polycarbonate, high-impact polystyrene, acrylics, and so forth.

Storm panels fabricated from transparent materials have proven to be more desirable than non-transparent materials as they allow natural light into the structure on which they are employed as well as allow occupants therein to view external weather conditions. In addition, these panels can comprise corrugated structures that allow for ventilation of a structure via the windows under which the storm panel is disposed. Although preferred, transparent storm panels (hereinafter referred to as "panels") can exhibit several shortcomings in visual appearance and structural performance.

Visually, some manufacturing processes can impart high haze and/or blemishes that detract from the panel's visual appearance. In addition, many polymeric materials employed can be prone to yellowing as a result of poor resistance to ultraviolet light. Structurally, some manufacturing processes can induce variations in panel thickness that reduces the overall physical properties of the panel (e.g., stiffness or durability).

Therefore, what is needed in the art is storm panels having improved weatherability and thickness uniformity, low haze, and/or comprise a reduced number of manufacturing induced blemishes compared to other manufacturing processes. What are also needed are efficient methods for manufacturing storm panels, which can provide these properties.

BRIEF SUMMARY

Disclosed herein are storm panels and method for making the same.

In one embodiment, a storm panel is disclosed, wherein the storm panel comprises a polymeric sheet having an arced geometry. The polymeric sheet comprises, a polymeric substrate layer, a polymeric top layer comprising an ultraviolet light stabilizer, and a polymeric bottom layer comprising an ultraviolet light stabilizer. The storm panel has a uniform thickness, exhibits less than or equal to about 4.0% haze, and exhibits a yellowness index shift that is less than or equal to about 9.0 after 1,500 simulated hours of aging.

In a second embodiment, a process for forming a storm panel is disclosed. The process comprises extruding a polymer melt and forming a polymer sheet from the polymer melt wherein the polymer sheet has a sheet thickness. The process further comprises forming a storm panel from the polymer sheet by advancing the polymer sheet through a forming section wherein the storm panel has a panel thickness that is within about ±30% of the sheet thickness, exhibits less than or equal to about 4.0% haze, and exhibits a yellowness index shift that is less than or equal to about 9.0 after 1,500 simulated hours of aging.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Figure 1:
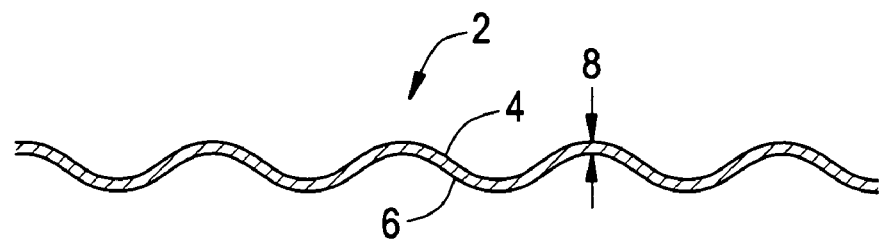
FIG. 1 is a partial and cross-sectional view of an exemplary storm panel.

Disclosed herein are storm panels and methods of manufacturing the same. To be more specific, transparent storm panels are disclosed that have improved weatherability, low haze, uniformity of thickness (e.g., a change in thickness across the panel of less than or equal to 25%), and/or comprise no or a minimum of manufacturing induced blemishes compared to panels produced by alternative methods. Efficient methods for producing these panels are also disclosed. To be more specific, a method of manufacturing these storm panels comprises first extruding a polymer sheet that comprises low haze. The polymer sheet is then heated and advanced through a forming process wherein the polymer sheet is formed into a storm panel in a stepwise manner, that is conducive to maintaining thickness uniformity. Once formed, the panel is cut to size and then subjected to optional secondary operations.

At the outset, unless defined otherwise, technical and scientific terms used herein have the same meaning as is commonly understood by one of skill in the art to which this invention belongs. The terms "first," "second," and "the like", as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. As used herein, "combination" is inclusive of blends, mixtures, alloys, reaction products, and the like. If ranges are disclosed, the endpoints of all ranges directed to the same component or property are inclusive and independently combinable (e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc.). The notation "±10%" means that the indicated measurement may be from an amount that is minus 10% to an amount that is plus 10% of the stated value. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants).

Several designs of transparent storm panels are disclosed herein with references to individual figures. One of skill in the art will easily recognize that many of the components of each of the embodiments are similar to or identical to each other. These various components can be added or omitted based on various design choices. As such, various elements and/or features can be introduced in a given figure with the understanding that transparent storm panels can be modified as taught herein to include features illustrated in other embodiments. Each of these elements is first introduced in the discussion of a given figure, but is not repeated for each embodiment. Rather, distinct structure is discussed relative to each figure/embodiment.

Referring now to FIG. 1, a storm panel 2 comprises a top surface 4, a bottom surface 6, and has a panel thickness 8. The storm panel can be employed as temporary protection of glass windows, store-fronts, and the like, during harsh environmental conditions during use (e.g., high winds, rain, hail, and/or impact from flying debris), and is even capable of withstanding prolonged exposure to sunlight. Although not illustrated, the storm panel 2 can be secured to a dwelling or structure to provide the desired protection. The storm panel 2 can be secured utilizing various methods, such as screws, bolts, rivets, pins, staples, nails, brads, connectors, clips, snaps, fittings, and so forth, as well as combinations comprising at least one of the foregoing.

Figure 2:
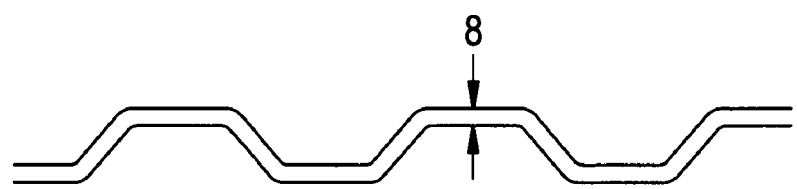
FIG. 2 is a partial and cross-sectional view of an exemplary alternative storm panel design.

The storm panel 2 can comprise any cross-sectional geometry that can be formed by the process disclosed herein (to be discussed below). Exemplary geometries can comprise, for example, arced geometries (e.g., a sinusoidal wave) having an amplitude greater than or equal to 0.5 in (1.27 centimeters (cm)), or, more specifically, greater than or equal to about 1 inches (2.54 cm), or, even more specifically, greater than or equal to about 1.5 inch (3.8 cm), such as that illustrated in FIG. 1, geometries comprising multiple line segments (e.g., a saw tooth wave, a square wave, and so forth), such as that illustrated in FIG. 2, a flat (i.e., planar) geometry, irregularly shaped geometries, and so forth, as well as combinations comprising at least one of the foregoing.

Figure 3:
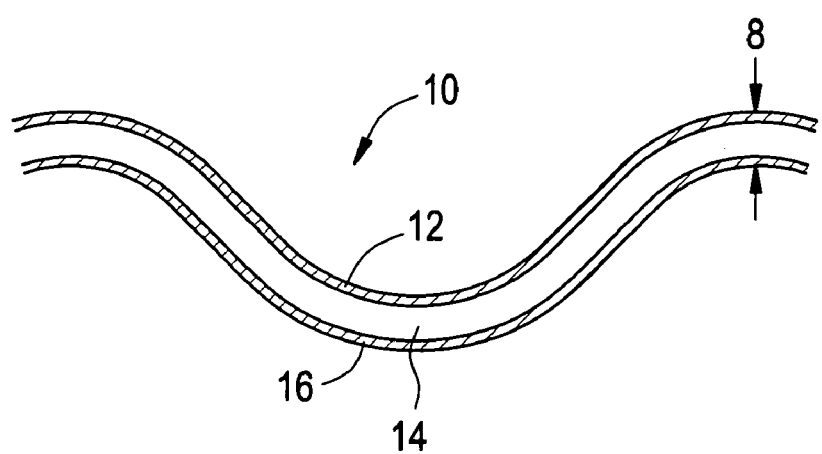
FIG. 3 is a partial and cross-sectional view of an exemplary multi-layer panel.

The storm panel 2 can also comprise layer(s) that can be configured in any configuration or orientation, such as the multi-layer panel illustrated in FIG. 3. Referring now to FIG. 3, the multi-layer panel 10 comprises a substrate layer 14 on which a top layer 12 and a bottom layer 16 are disposed. The layers (e.g., top layer 12, bottom layer 16, and substrate layer 14) comprise polymeric materials (e.g., thermoplastics and/or thermosets), which can be tailored (e.g., thickness, length, and/or width) to provide desired properties (e.g., impact resistance, rigidity, optical properties, and so forth). Exemplary polymeric materials comprise: polycarbonate, acrylic, polystyrene, acrylonitrile-butadiene-styrene, styrene acrylonitrile, polymethyl methacrylate, polyethylene terephthalate, polybutylene terephthalate, polyethylene, polypropylene, and so forth, as well as combinations comprising at least one of the foregoing. Optionally, additives can be added to any of the polymeric materials employed. Several exemplary additives comprise: antioxidants (e.g., organophosphites), fillers and reinforcing agents (e.g., glass fibers, silicates, $TiO_2$, graphite, calcium carbonate, mica, talc and the like), lubricants, UV absorbers, stabilizers (e.g., light stabilizers, or heat stabilizers), lubricants, plasticizers, colorants (e.g., pigments, or dyes), anti-static agents, blowing agents, impact modifiers, and so forth.

In the specific embodiment illustrated in FIG. 3, the multi-layer panel 10 is formed from polycarbonate (e.g., Lexan®, commercially available from GE Plastics, Pittsfield, Mass.) and comprises about 7.0 wt % (total weight percent) UV-stabilizer (e.g., Cyasorb® UV-5411, commercially available from Cytec Industries Inc., West Paterson, N.J.) within the top layer 12 and a bottom layer 16.

Figure 4:
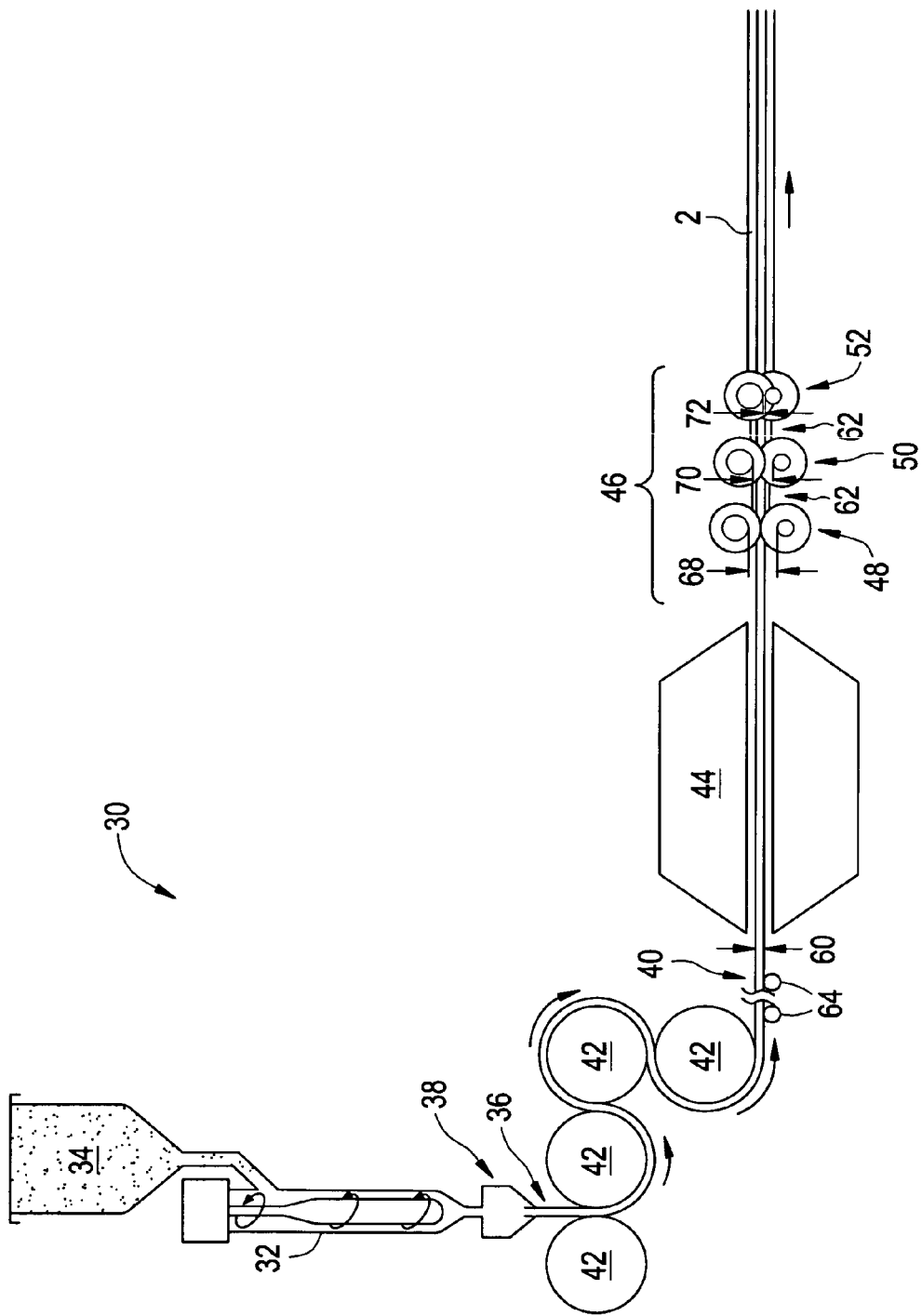
FIG. 4 is a side view of an exemplary storm panel manufacturing process.

In another embodiment, the multi-layer panel 10 can comprise differing polymers within the layers. To be more specific, the substrate layer 14 can comprise high-impact polystyrene and the top layer 12 and bottom layer 16 can comprise a UV-stabilized polycarbonate. In addition, although not shown, a polyurethane-base adhesive can be disposed between the substrate layer 14 and the outer layers (e.g., top layer 12 and bottom layer 16) to bond the polystyrene and polycarbonate materials. These multi-layer panels can be formed, for example, by co-extruding the different layers and then processing the layers as discussed herein. In another embodiment, the layers can be formed and then disposed adjacent one another prior to the heating process Referring now to FIG. 4, a side view of an exemplary storm panel manufacturing process, generally designated 30, is illustrated. The process comprises processes for forming a polymer sheet, heating the polymer sheet, and then forming the heated polymer sheet into a storm panel. To be more specific, the storm panel manufacturing process 30 comprises an extruder 32 that converts polymer pellets into a polymer melt (not shown). The extruder 32 can be a single screw extruder comprising a 3.5 inch diameter extruder screw having a length over diameter ratio of 30:1 (e.g., Davis Standard LLC, Pawcatuck, Conn.). Attached to the extruder 32 is a hopper/dryer 34 that supplies polymer pellets (not shown) through a throat, and into the extruder 32. The polymer pellets are melted and conveyed through the extruder 32 to a sheet die 38 (e.g., coat hanger die, fishtail die, slot die, and so forth). The sheet die 38 forms a molten extrudate 36 having a sheet-like geometry that can be fed to a set of calendar rolls 42.

The calendaring process comprises routing the molten extrudate 36 through a pair of co-rotating calendaring rolls 42 which compress the molten extrudate 36 into a polymer sheet 40. The polymer sheet 40 is then advanced through and/or on additional calendaring rolls 42, which further reduce the thickness of the polymer sheet 40 to the desired sheet thickness 60.

During the calendaring process, the polymer sheet 40 is slowly cooled to reduce and/or prevent the formation of haze. This can be achieved by supporting the sheet over rollers 64 as the film cools in ambient or heated air. In another method, temperature controlled calendaring rolls 42 (e.g., internal flow paths, internal electrical resistance heaters, and/or external heaters) can be employed to control the temperature and rate at which the polymer sheet 40 cools.

Once cooled, the polymer sheet 40 is conveyed through an oven 44, wherein it is heated. The polymer sheet 40 is heated to a temperature that is adequate to form the polymer sheet 40 into a storm panel, which can be a temperature that is equal to or above the glass transition temperature (Tg) of the polymer (s) employed for the polymer sheet and below the melt temperature (Tm), of the polymer(s) employed.

The temperature of the sheet can be tailored by adjusting the energy output of the oven 44, the residence time within the oven (e.g., line speed), proximity of the sheet to the heating elements within the oven, the temperature of the polymeric sheet 40, as well as other variables. The oven 44 can comprise any type of convective and/or radiative heat source, such as silicon carbide cartridge heaters quartz radiative lamps, and so forth. Also, although not illustrated, process controllers and sensors can he employed to control the output of the heaters. Any temperature controllers and sensors can be employed. In one embodiment, the oven 44 can be controlled by a proportional-integral-derivative (PID) controller utilizing a closed-loop feedback method, which can be based on the temperature of the polymer sheet 40 measured prior to the sheets entering, and after the sheet exits, the oven 44 utilizing infrared temperature sensors.

Once the polymer sheet 40 has been heated, the sheet is conveyed through a forming section 46 comprising one or more sets of forming rollers. In the exemplary storm panel manufacturing process 30 illustrated, the forming section 46 comprises a first roller set 48, second roller set 50, and a third roller set 52. Each roller set comprises a roller gap between the upper and lower rollers. The first roller set comprises a first roller gap 68, the second roller set 50 comprises a second roller gap 70, the third roller set 52 comprises a third roller gap 72.

Figure 5:
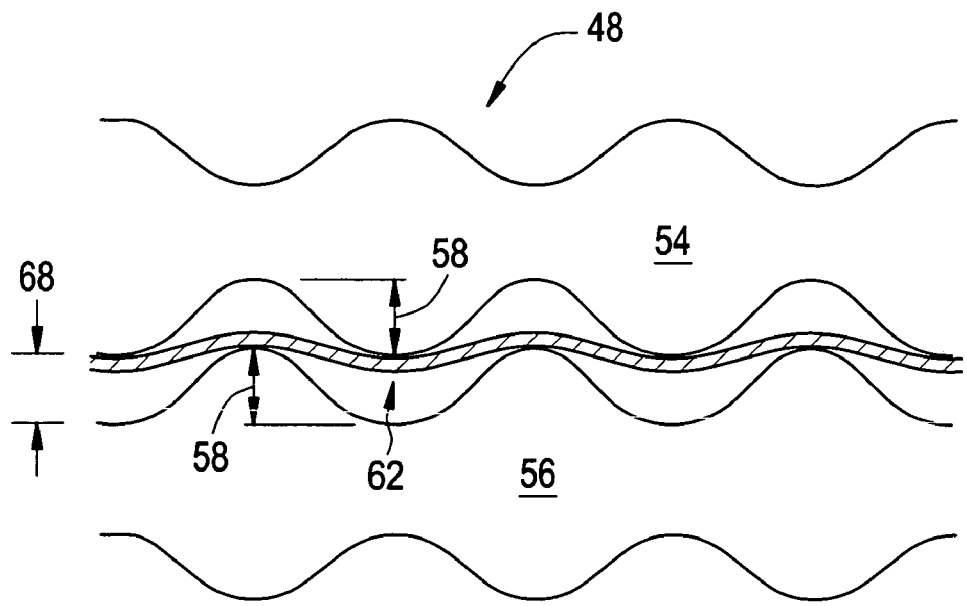
FIG. 5 is a partial front view of a set of forming rollers.

In the specific embodiment described, each roller set (e.g., first roller set 48, second roller set 50, and third roller set 52) comprises a sinusoidal profile, as illustrated in FIG. 5. In FIG. 5, a partial front view of the first roller set 48 is illustrated. The first roller set 48 comprises an upper roller 54 and a lower roller 56, which are configured with mating profiles that are disposed to comprise the first roller gap 68 therebetween. The sinusoidal geometry of the upper roller 54 and the lower roller 56 comprise an amplitude 58 measured from the peak to the base of the sinusoid. The first roller gap 68 is configured so that portions of the upper roller 54 and portions of the lower roller 56 contact and deform the polymer sheet 40 (see FIG. 4) to form a partially shaped storm panel 62.

Referring again to FIG. 4, the partially formed storm panel 62 then travels through the second roller set 50, comprising a second roller gap 70 that is less than the first roller gap 68, which further deforms the partially formed storm panel 62 into a shape that yet further resembles the desired storm panel. Lastly, the partially formed storm panel 62 travels through the third roller set 52, comprising a third roller gap 72 that is less than the second roller gap 70, which deforms the partially formed storm panel 62 into a storm panel which comprises a sinusoidal cross-sectional geometry, such as those illustrated in FIG. 1 or FIG. 3. The degree of decrease in the roller set gap is dependent upon the number of roller sets.

In one specific embodiment, a polymer sheet 40 is formed that comprises an initial sheet thickness 60 equal to about 0.20 in. (5.08 mm), and the desired storm panel will comprise a sinusoidal pattern having an amplitude 58 of about 1.0 in. (25.40 mm) and a panel thickness 8 of about 0.20 in. (5.08 mm), the first roller gap 68 can be equal to about 1.2 in. (30.48 mm). The second roller gap 70 can be about 0.60 in. (15.24 mm), and the third roller gap 72 can be about 0.20 in. (5.08 mm).

In an alternative embodiment, each roller set can comprise a roller gap (e.g., first roller gap 68, second roller gap 70, third roller gap 72), that is about equal. Further, the amplitude 58 can be varied such that the polymer sheet 40 is formed in a step-wise manner. For example, the first roller set 48 can comprise a sinusoidal geometry having an amplitude 58 of about 0.75 in. (1.91 cm), the second roller set 50 can comprise a sinusoidal geometry having an amplitude 58 of about 1.5 in. (3.81 cms), and the third roller set 52 can comprise a sinusoidal geometry having an amplitude 58 of about 2.0 in. (5.08 cms).

The forming rollers (e.g., upper roller 54 and lower roller 56) can comprise any configuration that can form, shape, or convey the polymer sheet 40. For example, in one embodiment, the forming rollers can comprise axels having forming wheels (e.g., skate wheels) disposed thereon. The forming wheels can comprise any geometry, and can be spaced at any horizontal distance (e.g., forming a gap therebetween), that can form a polymer sheet 40 into a desired geometry (e.g., the sinusoidal geometry of the multi-wall panel 10). The horizontal distance between the rollers and/or forming wheels can be at least the thickness of the sheet. Not to be limited by theory, it is believed that if this gap is too wide, the resulting panel will comprise a geometry that will not be conducive to the structural integrity desired for storm panels. Therefore, the horizontal distance can comprise any distance that provides sufficient structural integrity at the amplitude formed such that the resulting panel can be used as a storm panel. For example, the horizontal distance can be about 100% to about 1,000% of the sheet thickness depending upon the particular amplitude, or more specifically, about 100% to about 500%, or even more specifically, about 100% to about 250%.

Yet even further, the spacing between the rollers can be about equal (e.g., forming a sinusoidal geometry having a constant wavelength) or vary between roller sets (e.g., forming a sinusoidal geometry having a variable wavelength). For example, referring again to FIG. 5, each peak of the sinusoidal geometry can be formed by an individual forming wheel wherein each forming wheel is spaced at a distance from one another that forms a desired wavelength of the sinusoidal geometry The surface finish of the forming rollers can impart a surface finish in the top surface 4 and/or bottom surface 6 of the storm panel. Therefore, if a mirror-like surface finish is desired in the storm panel, forming rollers comprising a mirror-like unflawed surface are employed. Worn or damaged forming rollers can impart blemishes in the surfaces of the storm panels during production, and therefore, durable materials can be employed for the forming rollers to prolong service life and resist damage. Exemplary materials include, metals (e.g., copper, aluminum, nickel, iron, chromium, and so forth), metal alloys (e.g., stainless materials, nickel-chromium superalloys, and so forth), metal oxides (e.g., yttrium stabilized zirconia), polymers (e.g., ethylene propylene diamine monomer based rubber (EPDM), silicone, urethane, polytetrafluoroethylene, and so forth), as well as configurations comprising combinations of at least one of the foregoing. For example, in one embodiment, a set of forming rollers 48 can be manufactured from Grade 316 stainless steel and comprise a chromed external surface that is polished to a mirror-like finish.

To enable enhanced control of the temperature of the polymer sheet as it is advanced through the forming section 46, the temperature of the environment around the forming section 46 can be controlled (e.g., oven). In addition, the forming rollers can also comprise thermal transfer elements (e.g., ceramic heating cartridges, cooling elements and the like) and/or flow paths that allow thermal transfer media (e.g., oil, water, ethylene glycol, and so forth) to flow through the roller, as well as other methods, for controlling the temperature of the rollers. In a specific embodiment, each roller in a set of forming rollers can be configured with an internal spiral flow path through which a heated media (e.g., oil, ethylene glycol, and/or water) can flow. The flow path can comprise an inlet disposed on one end of the roller's axle and an outlet disposed on the other end of the roller's axle. In another example, each roller in a set of forming rollers can comprise a spirally wrapped resistive heating element that is capable of connecting to an electrical power source and heating the roller.

Although not shown, a masking film can be applied to one or both surfaces of the polymer sheet 40 or partially formed storm panel 62, e.g., to inhibit stretching of the sheet, to protect the surfaces of the storm panels during secondary processes and/or shipping and handling, and so forth. If applied to the polymer sheet 40 before the sheet is advanced through the forming section 46, the masking film can inhibit and/or reduce stretching of the polymer film 40 within the forming section 46, which can improve panel thickness 8 uniformity of the storm panel. To be more specific, if the masking film comprises a higher glass transition temperature than the polymer sheet 40 and the polymer sheet 40 is heated to a forming temperature, that is below the glass transition temperature of the masking film, as the polymer sheet 40 or partially formed storm panel 62 is deformed by the forming rollers, the masking film will contour to the forming rollers and resist stretching. As a result, as the polymer sheet 40 (or partially formed storm panel 62) is formed into the storm panel, the edges of the polymer sheet 40 are drawn closer together.

The masking film can comprise any polymer having a glass-transition temperature sufficiently greater than the glass-transition temperature of the polymers employed for the polymer sheet 40 to attain the desired structural integrity. Exemplary materials comprise polyesters, polyetherimide, polysulfone, polyimide, and so forth, as well as combinations comprising at least one of the foregoing. Furthermore, it is desirable that the masking film is a polymer that can be easily removed from the storm panel. The masking film can comprise a thickness of about 0.002 inches to about 0.020 inches; however, the specific thickness is a function of the materials employed, cross-sectional geometry, end-users requirements, desired structural integrity, and/or other variables. In one specific example, a polyetherimide (Ultem®, commercially available from General Electric Company, GE Plastics, Pittsfield, Mass.) masking film comprising a thickness of about 0.005 in (0.127 mm) is laminated on the top and bottom surfaces of a polycarbonate polymer sheet 40 prior to entering the forming section 46.

Once the storm panel 2 (or multi-layer panel 10) has been formed and exits the forming section 46, additional sets of forming rollers 48 can be employed to support the panel until the panel cools to a desired temperature (not shown). As previously mentioned, the polymer can be gradually cooled (e.g., in contact with room temperature air) to minimize or prevent the formation of haze within the storm panel. Once the storm panel's temperature has been reduced (e.g., wherein the polymer is no longer elastic/rubbery and its molecules have little relative motion), the panel can be rapidly cooled, trimmed, cut-to-length, and subjected to secondary operation(s) (e.g., annealing, printing, labeling, and further assembly). In one specific embodiment, a storm panel can be cooled on a series of lower rollers 56, cut to length with an indexing cut-off saw, labeled, and fixed within a frame wherein the frame provides an aesthetically desirable look, enhances structural integrity, and provide a means, or system, for securing the product to a structure.

The storm panel manufacturing process 30 described above can be capable of producing storm panels at a rate that is greater than or equal to about 5 feet per minute, ft/min (1.52 meters per minute, m/min). However, a rate that is greater than or equal to about 20 ft/min (6.10 m/min), or even greater than or equal to about 45 ft/min (13.72 m/min) is possible.

The storm panel manufacturing process 30 is capable of producing a storm panel that comprises a panel thickness 8 that is approximately uniform across the width of the panel. This is desirable for the reason that thin sections in the storm panel (e.g., caused by stretched sections in the polymer film 40) reduce the panel's physical properties (e.g., strength and rigidity). In one specific embodiment, the panel thickness 8 is within about ±30% of the sheet thickness 60, or, more specifically, within about ±20% of the sheet thickness 60, or even more specifically, within about ±10% of the sheet thickness 60.

The storm panel manufacturing process 30 is capable of producing a storm panel comprising a panel thickness 8 that is approximately uniform across its width because the forming process minimizes stretching of the polymer sheet 40 during the forming process. Therefore, the width of the polymer sheet 40 is decreased as the storm panel is formed, as illustrated in FIG. 6.

Figure 6:
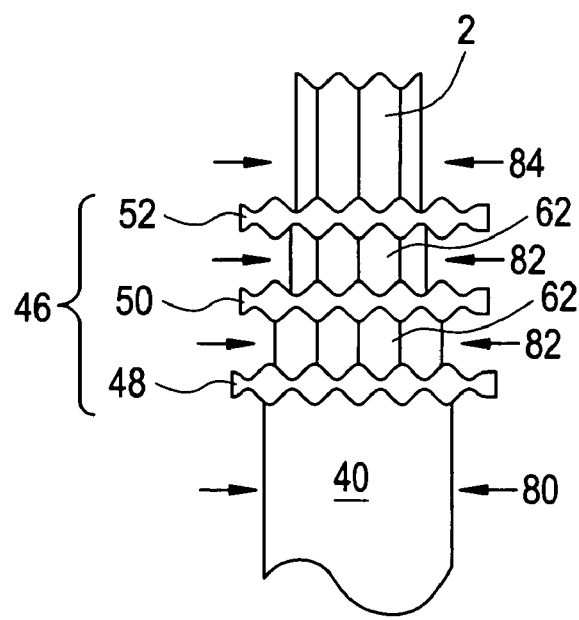
FIG. 6 is a top view of the exemplary forming section.

Referring now to FIG. 6, a top view of the forming section 46 is illustrated. In the illustration, the forming section 46 comprises a first roller set 48, a second roller set 50, and a third roller set 52. A polymer sheet 40, comprising an original width 80, is introduced to the first roller set 48 that forms a partially formed storm panel 62 having an intermediate width 82 therefrom. The partially formed storm panel 62 is then introduced to the second roller set 50, which further forms the partially formed storm panel 62 into a shape yet further resembling the desired storm panel's shape. This partially formed storm panel 62 is then introduced to the third roller set 52, which produces a storm panel 2 (or multi-layer panel 10).

In another embodiment, the forming section 46 can be configured such that each roller set shapes a portion of the polymer sheet 40. For example, the first roller set 48 can be configured to form a first portion of the polymer sheet 40 into a desired shape (e.g., a shape resembling the multi-layer panel 10). Thereafter, the second roller set 50 can be configured to shape a second portion of the polymer sheet 40 into a desired shape. Thereafter, if the forming section 46 comprises three roller sets, the third roller set 52 can be configured to form the polymer sheet 40 into a fully formed multi-layer panel 10. In one specific example, a forming section 46 is configured such that a polymer sheet 40 is formed into a multi-layer panel 10 using three roller sets wherein the first roller set forms one-third of the panel's width (i.e. one-third of the original width 80) located in the center of the polymer sheet 40 into a geometry resembling the multi-layer panel 10 (hereinafter referred to as the first formed section). Thereafter, the second roller set is configured to further form portions of the polymer sheet 40 disposed on either side of the first formed section such that a total of two-thirds of the polymer sheet's original width 80 comprises a geometry resembling the multi-layer panel 10 (hereinafter referred to as the second formed section). Thereafter, the third roller set is configured to further form the portions of the polymer sheet 40 disposed on either side of the second formed section, such that the total original width 80 of the polymer sheet 40 has been shaped into a multi-layer panel 10.

The storm panel manufacturing process 30, as well as the others discussed, provides several benefits compared to alternative manufacturing methods such as thermoforming or profile extrusion. To be more specific, the thermoforming process is a non-continuous process wherein a section of a polymer sheet is heated and disposed within a mold via vacuum and/or via pressurized air. The polymer sheet then cools and retains the shape of the mold. During the process, the polymer sheet is stretched as it is pulled/forced into the mold, which thins the polymer sheet and thusly reduces the physical properties of the product. In addition, during the thermoforming process the polymer sheet is cooled rapidly as it contacts the mold. The resulting sheet is generally hazy (if it is a transparent sheet) and has poor visual appearance.

Compared to the thermoforming process, the storm panel manufacturing process 30 described herein provides greater manufacturing efficiency and greater rates. In addition, the process disclosed herein enables manufacturers to produce storm panels with approximately uniform panel thickness, which results in improved structural strength compared thermoformed storm panels. Yet further, the process disclosed enables the polymer sheet and storm panel to be cooled at a slow rate, which reduces haze.

In the profile extrusion process, a polymer is converted into a polymer melt by an extruder and forced through a profile die. The profile of the die produces an extrudate that comprises a geometry that is similar to the finished panel. Once extruded, the extruded profile is cooled in a cooling apparatus (e.g., air, water bath, or vacuum bath). Once cooled, the extrudate is cut to length. The profile extrusion process, however, inherently produces blemishes on the surface of the storm panel, such as, die lines (e.g., linear distortions in the extrudate's surface caused by flow disturbances within the die or at the die face) and sizing lines (e.g., linear distortions in the extrudate's surface caused by the sizing apparatus), that detract from the aesthetics of the extruded profile.

Experimental Results

A multi-layer panel 10 was compared to two alternative storm panels. One of the panels was produced via a profile extrusion process (ClearGuard, manufactured by Transparent Protection Systems, Inc., West Palm Beach, Fla.), and the other was produced via thermoforming a 3.0 mm thick extruded sheet (Lookout Shutters Inc., Calhoun, Ga.). The multi-layer panel 10 comprised a substrate layer 14 comprising polycarbonate. A polycarbonate top layer 12 and a polycarbonate bottom layer 16 were disposed on the substrate layer 14. The bottom layer 16 and top layer 12 also comprised about 7.0 wt % UV-stabilizer (Benzotriazol, manufactured by Amfine Chemical Corporation, Upper Saddle River, N.J.). The bottom layer 16 and the top layer 12 comprised thicknesses of about 30 micrometers (1.18 mils) to about 150 micrometers (5.91 mils). The multi-layer panel 10 comprised a thickness of 2.34 mm. Three tests were conducted on the panels, haze testing via ASTM-D1003-00, panel thickness testing, and yellowness index testing via ASTM D1925-70.

The panel thickness uniformity testing was conducted to compare the thickness uniformity of the multi-layer panel 10 to the panels produced via alternative methods. To measure panel thickness uniformity, sixteen samples of each panel were measured at a multitude of locations across the width of the panel using a Mitutoyo digital caliper (Mitutoyo America Company, Aurora, Ill.). From the data collected, the lowest and highest measurements were used to indicate the range of the panel thickness. The range exhibited by the multi-layer panel 10 was 2.0 mm to 2.3 mm (0.079 inches to 0.091 inches); i.e., a change in thickness ((maximum thickness minus minimum thickness) divided by minimum thickness) of about 15%. The range for the thermoformed panel was about 1.5 mm to 3.0 mm (0.059 inches to 0.118 inch); i.e., a change in thickness of about 100%. The range for the profile extrusion panel was 2.4 mm to 2.7 mm (0.095 inches to 0.106 inch); i.e., a change in thickness of about 12.5%. The narrower the thickness ranges, the greater the thickness uniformity. From the results generated, the multi-layer panel 10 exhibited one of the lowest panel thickness ranges (i.e., about 0.3 mm (0.012 in)), which was similar to that produced by the profile extrusion process. The thickness range produced by the thermoforming process was markedly broader (i.e., 1.5 mm (0.059 in)). From these results, it can be interpreted that the storm panels produced by the forming method disclosed herein and the profile extrusion process will exhibit improved physical properties compared to the storm panel produced via the thermoforming method (e.g., impact resistance and/or stiffness). In addition, it can also be interpreted that the overall thickness of the sheet employed to form the multi-wall panel 10 can have a thickness that is less than the thickness of the sheet employed for the thermoforming process to provide comparable physical properties, which will correspond to reduced raw materials costs and final product costs.

The data presented above for the multi-layer panel 10 can also be employed to determine the percentage change in the sheet thickness 60 prior to, and after, it was formed into the storm panel. This value is determined to evaluate if the panel thickness 8 differs from the sheet thickness 60 greater than about 30%, whereby differences greater than about 30% indicate an undesirable loss in physical properties (e.g., rigidity).

The original sheet thickness 60 of the polymer sheet 40 employed to form the multi-layer panel 10 was about 2.36 mm (92.9 mils). Therefore, using the panel thickness range reported above, the upper end of the panel thickness range, 2.3 mm (90.6 mils), was about 2.5% lower than the sheet thickness 60, and the lower end of the panel thickness range, 2.0 mm (78.7 mils), was about 15.3% lower than the sheet thickness 60. Therefore, the panel thickness 8 was within about ±30% of the sheet thickness 60, retaining an acceptable amount of its physical properties. The panel thickness 8 was actually within about ±20% of the sheet thickness 60. It is believed that a panel thickness 8 within about ±10% of the sheet thickness 60 is attainable with the present process.

The yellowness index shift of the panels was evaluated after simulated aging so that the muti-layer panels could be compared to the thermoformed and extruded panels after simulated weathering. During weathering, eight samples of each panel were fixed within a QUV accelerated weathering tester (manufactured by Q-Panel Lab Products, Cleveland Ohio) that was configured to operate at 60° C. and expose the panels to an irradiance of 0.55 W/m$^2$/nm (Watts per meter squared per nanometer) via UVB-313 lamps. Eight samples of each panel were tested. They were oriented such that four samples were disposed with their top surface facing the lamps, and four samples disposed with their bottom surface facing the lamps. This was done such that the effects of weathering could be evaluated on both sides of the panel.

The yellowness index shift was measured after 700, 1,100, and 1,500 simulated hours of exposure within the QUV apparatus. Upon removal, the panels were gently washed with soapy water (to ensure the generation of proper results) and analyzed via ASTM D1925-70 using a Gretag-Macbeth Color-Eye 7000A spectrophotometer. The data gathered was averaged. These averages are indicated in the table below.

TABLE 1

| Simulated Aging | | Multi-layer panel (Yellowness shift) | Thermo-formed (Yellowness shift) | Profile Extrusion (Yellowness shift) |
|---|---|---|---|---|
| 700 hours | Top Surface | 4.0 | 2.6 | 11.7 |
| | Bottom Surface | 4.0 | 3.9 | 11.6 |
| 1,100 hours | Top Surface | 3.5 | N/A* | 13.0 |
| | Bottom Surface | 4.3 | 10.0 | 12.3 |
| 1,500 hours | Top Surface | 3.9 | 2.5 | 16.8 |
| | Bottom Surface | 4.0 | 12.6 | 12.5 |

*Data was not collected for this data set at this time interval.

From the data generated, it can be determined that the multi-layer panel 10 did not exceed a yellowness index shift (i.e., a change in yellowness from before the testing to after the aging) of about 4.0 on its top surface, and about 4.3 on its bottom surface, for all time intervals tested. Upon review of the thermoformed samples, the panels did not exceed an average yellowness of about 2.6 on their top surface; however did exhibited substantial yellowness shift on their bottom surface. Upon review of the extruded samples, these panels produced a yellowness index shift of up to about 16.8 on its top surface, and a yellowness index shift of up to about 12.5 on its bottom surface.

Evaluating these results further, it is established that the multi-layer panel 10 exhibits greater overall resistance to yellowing than both the top surface and bottom surface of the extruded sample, and greater overall resistance to yellowing than the bottom surface of the thermoformed sample. Even further, it is established that the multi-layer storm panel's yellowness index shift, on both surfaces, is less than or equal to about 9.0 after 1,500 simulated hours of aging, or more specifically, less than or equal to about 7.0 after 1,500 simulated hours of aging, or even more specifically, less than or equal to about 5.0 after 1,500 simulated hours of aging.

Prior to accelerated aging, all samples were haze tested using a BYK Gardner Haze-Gard Plus Haze Meter. The data collected was evaluated and the range of resulting haze values is reported in the Table 2 below.

TABLE 2

| Simulated Aging | Multi-layer panel (Haze) | Thermoformed (Haze) | Profile Extrusion (Haze) |
|---|---|---|---|
| 1,500 hours | 1.8-2.2 | 1.9-4.2 | 4.0-4.5 |

From the haze data presented above, it can be seen that the multi-layer panel 10 exhibited lower haze than the thermoformed panel and the extruded profile panel. To be more specific, the multi-layer panel 10 exhibited a range of haze values between 1.8 and 2.2, while the thermoformed panel exhibited haze values between 1.9 and 4.2, and the extruded profile exhibited haze values between 4.0 and 4.5.

As disclosed in the detailed discussion above, the storm panel manufacturing process disclosed herein provides a continuous manufacturing process that is capable of producing storm panels that exhibit enhanced properties compared to storm panels produced by alternative methods. To be more specific, the storm panels can be formed that exhibit haze values that are less than or equal to about 4.0%, comprise a panel thickness that is within about ±30% of the sheet thickness, exhibit a yellowness index shift that is less than or equal to about 9.0 after 1,500 simulated hours of aging, and that have a change in thickness across the panel of less than or equal to about 25%, even less than or equal to about 20%, and even less than or equal to about 15%. From the samples tested that were produced via alternative methods, all of these advantageous properties were not achievable in one multi-layer panel. Therefore, the storm panel manufacturing process, and the storm panels produced therefrom, provide for currently unmet needs in the art of storm panels.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A storm panel, comprising:
   a polymeric sheet having an arced geometry with an amplitude of greater than or equal to about 1.27 cm, the polymeric sheet comprising
   a polymeric substrate layer having a top surface and a bottom surface;
   a polymeric top layer disposed adjacent to the top surface, wherein the top layer comprises a top layer ultraviolet light stabilizer;
   a polymeric bottom layer disposed adjacent to the bottom surface, wherein the bottom layer comprises a bottom layer ultraviolet light stabilizer;
   wherein the storm panel has a uniform thickness;
   wherein the storm panel exhibits less than or equal to about 4.0% haze as tested via ASTM-D1003-00; and,
   wherein the storm panel exhibits a yellowness index shift that is less than or equal to about 9.0 after 1,500 simulated hours of aging at an irradiance of 0.55 W/m$^{2/}$nm and 60° C., as measured via ASTM D1925-70.

2. The storm panel of claim 1, wherein the panel thickness is within about +20% of the sheet thickness.

3. The storm panel of claim 2, wherein the panel thickness is within about +10% of the sheet thickness.

4. The storm panel of claim 1, wherein the yellowness index shift is less than or equal to about 7.0.

5. The storm panel of claim 4, wherein the yellowness index shift is less than or equal to about 5.0.

6. The storm panel of claim 1, wherein a change in thickness across the storm panel is less than or equal to about 20%.

7. The storm panel of claim 1, wherein the amplitude is greater than or equal to about 2.54 cm.

8. The storm panel of claim 1, further comprising a masking film.

9. The storm panel of claim 4, wherein the yellowness index is less than or equal to about 4.5.

* * * * *